(12) United States Patent
Teich et al.

(10) Patent No.: US 7,458,163 B2
(45) Date of Patent: Dec. 2, 2008

(54) BAGEL SCOOPER

(76) Inventors: Elizabeth Chelsea Teich, 2 Kotfield Ct., Melville, NY (US) 11747; Meghan Joy Musgnug, 291 Maplewood Rd., Huntington Station, NY (US) 11746

( * ) Notice: Subject to any disclaimer, the term of this patent is extended or adjusted under 35 U.S.C. 154(b) by 422 days.

(21) Appl. No.: 11/063,136

(22) Filed: Feb. 22, 2005

(65) Prior Publication Data

US 2005/0138818 A1 Jun. 30, 2005

Related U.S. Application Data

(63) Continuation-in-part of application No. 10/644,470, filed on Aug. 20, 2003, now abandoned.

(60) Provisional application No. 60/404,842, filed on Aug. 21, 2002.

(51) Int. Cl.
*B26B 3/00* (2006.01)
*A47J 43/28* (2006.01)
*A47L 13/02* (2006.01)
*A47L 17/06* (2006.01)
*A47L 23/22* (2006.01)
*B05C 17/10* (2006.01)

(52) U.S. Cl. .......................... 30/425; 30/171; 30/147; 30/149; 30/150; 15/236.08

(58) Field of Classification Search .................. 30/147, 30/149, 150, 171, 325; D7/643, 645, 647, D7/653, 688, 642, 644, 648; 601/137; 294/1.3, 294/1.4, 1.5, 52, 55, 7, 49, 50, 50.5, 5, 57; 15/236.08

See application file for complete search history.

(56) References Cited

U.S. PATENT DOCUMENTS

| 20,400 | A | | 6/1858 | Struver | 256/67 |
|---|---|---|---|---|---|
| 631,818 | A | | 8/1899 | Reeves et al. | 30/150 |
| 644,732 | A | | 3/1900 | Crandall | |
| 675,475 | A | | 6/1901 | Glover | 416/71 |
| 742,685 | A | | 10/1903 | Leach | 30/150 |
| 868,583 | A | | 10/1907 | Schuyler | 30/149 |
| 1,347,307 | A | | 7/1920 | Thomas | 30/1 |
| 1,461,686 | A | | 7/1923 | Stone | 15/104.011 |
| 1,991,267 | A | | 2/1935 | Waldron et al. | |
| 2,259,662 | A | * | 10/1941 | Roberts | 30/171 |
| 2,447,301 | A | | 8/1948 | Wright | |
| 2,541,559 | A | * | 2/1951 | Ternullo | 30/136 |
| 2,634,497 | A | * | 4/1953 | Waldesbuehl | 30/142 |

(Continued)

*Primary Examiner*—Ghassem Alie
*Assistant Examiner*—Bharat C Patel
(74) *Attorney, Agent, or Firm*—Alfred M. Walker

(57) ABSTRACT

A bagel scoop removes excess dough from a piece of baked goods, such as a bagel. The bagel scoop includes a handle, and a concave, preferably shallow elliptical spoon-shaped closed combined blade and scoop structure, having a downward curvature, to enable scooping and removal of dough. The outer distal end of the combined blade and scoop structure is preferably serrated, to allow for scraping and scooping of the bagel core dough at a leading edge of the blade. The combined blade and scoop structure is attached to a stem, which, in turn, is attached to the handle. A small auxiliary scraper is provided at an opposite end, for fine scraping and removing of excess dough residue not taken by the shallow elliptical spoon-shaped closed combined blade and scoop structure.

3 Claims, 5 Drawing Sheets

U.S. PATENT DOCUMENTS

| | | | | |
|---|---|---|---|---|
| 2,719,316 | A * | 10/1955 | Hauser | 15/236.08 |
| 2,778,109 | A * | 1/1957 | Haynes | 30/324 |
| D180,411 | S * | 6/1957 | Noguchi | D7/653 |
| D180,412 | S * | 6/1957 | Noguchi | D7/653 |
| 3,121,951 | A * | 2/1964 | Green | 30/149 |
| 3,937,850 | A | 2/1976 | Farha et al. | 426/484 |
| 4,200,948 | A * | 5/1980 | Nesseth | 15/236.08 |
| 4,345,516 | A | 8/1982 | Sinclair | 99/426 |
| 4,667,362 | A * | 5/1987 | Mattingly | 15/236.08 |
| 4,825,551 | A * | 5/1989 | Sherblom | 30/326 |
| 4,979,419 | A | 12/1990 | Sonkin | 83/875 |
| 5,033,193 | A | 7/1991 | Valenti | 30/124 |
| 5,060,386 | A | 10/1991 | Mars | 30/327 |
| 5,182,860 | A | 2/1993 | Kuhlman | 30/325 |
| 5,557,998 | A | 9/1996 | Schwartz et al. | 83/875 |
| 5,779,475 | A * | 7/1998 | Patel | 433/141 |
| D405,660 | S * | 2/1999 | Hansen et al. | D7/688 |
| 5,920,991 | A | 7/1999 | Tracy | 30/280 |
| 5,975,909 | A * | 11/1999 | Ritchie | 434/127 |
| 6,145,204 | A | 11/2000 | Cash | 30/322 |
| 6,221,034 | B1 | 4/2001 | Chaplin | 601/137 |

* cited by examiner

BAGEL SCOOPER

RELATED APPLICATIONS

This application is a continuation-in-part of application Ser. No. 10/644,470, filed Aug. 20, 2003, now abandoned, which application is based upon provisional application No. 60/404,842, filed Aug. 21, 2002 and claims benefit under 35 U.S.C. 119(e).

FIELD OF THE INVENTION

The present invention relates to a device for scooping and removing excess dough from the inside of sliced bagels.

BACKGROUND OF THE INVENTION

The present invention relates to a device for removing excess portions of the interior the dough from food products, such as bagels, which have been cut in half. The ability to scoop out the excess dough from the interior of a bagel can greatly decrease the number of calories and carbohydrates in a bagel. Also, the ability to scoop out a bagel while using a manually operable tool device, instead of with one's fingers, provides a more sanitary method of removal than using one's fingers.

U.S. Pat. No. 3,121,951 of Green, U.S. Pat. No. 1,347,307 of Thomas, U.S. Pat. No. 6,145,204 of Cash, U.S. Pat. No. 4,825,551 of Sherblom and U.S. Pat. No. 5,182,860 of Kuhlman each describe food utensils with undesirable inflection points between the respective working portion and the respective handles.

Neither Green '951 nor Thomas '307 have a scoop portion connected to a stem portion, further connected to a handle portion, each having downward facing concave curvatures, where no inflection point is present.

If one takes any spoon like Green '951's and turn it upside down, the scoop is faced concavely downward but the handle is bowed convexly upward, unlike the handle of the present invention which is easy to grasp because it bows concavely downward with the scoop. That's because any spoon like Green '951's has a curve for the scoop, which changes by inflection to a reverse curvature at the point where it meets the handle. Hence it extends uncomfortably upward in a concavity when the scoop portion is turned upside down, with an upwardly extending convexity. Turning a spoon upside down, such as that of Green '951, will also create a force at the inflection point during a scooping action, which will cause it to snap and eventually break off. This is because the handle structure and angle is not designed for the force required to perform a bagel scoop function. The spoon of Green '951, is designed specifically for an upward scooping motion, not a downward scooping motion as in the bagel scooper of the present invention.

According to standard geometric mathematical definitions, there is a definition number "5" under "inflection" in the AMERICAN COLLEGE DICTIONARY, Clarence L. Barnhart, Editor, Random House, NY, circa 1955 copyright, as follows:

"Math. a change of curvature from convex to concave or vice versa".

The cited prior art of Green '951 and Thomas '307 has that reverse curvature point of inflection in any embodiment, but the bagel scooper of the present invention does not.

For example, Green '951 teaches using its serrated spoon instrument more for scraping food, such as corn for people with poor or no teeth. However, the reference actually does not teach the use of scooping interior dough by rearward pulling, such as bagel dough.

Green '951 is concerned with an upwardly facing shallow concave bowl with serrated teeth to advance forwardly against fruit and vegetable pulp. Its concave bowl extends substantially parallel to the longitudinal axis of the handle of the spoon.

Use of Green '951 to scoop bagels is unsatisfactory, because its scoop is axially aligned with the handle. It does have the downward facing concave bowl, preferably approximately at a 90° angle, for pulling the excess dough out. Additionally, the inflection point located between the spoon portion and the handle is subject to bending or breakage, unlike the consistently concave scoop and handle of the present invention.

Green '951's upwardly facing concave bowl hinders its effectiveness in scooping bagels.

Thus, Green '951 teaches that the serrated edge not only grasps the food but cuts it in a forward motion as well. Therefore use of Green '951's upwardly extending serrated spoon instrument, whether used right side up or upside down, is not suitable for use with the delicate wall of the bagel, due to the forward motion of the serrated spoon, and the detrimental effects of ripping the delicate bagel wall.

Thus, the general use of Green '951's upwardly extending serrated spoon, in conjunction with scooping bagels innards of dough, would be suspect as to its effectiveness or expectation of success, unless the upward orientation of the concave portion were reversed downwardly, as in the bagel scoop of the present invention, preferably substantially perpendicular to the handle, so that it can scooped rearwardly.

Simply using a serrated spoon with bagel scooping would be dangerous because the forward pushing motion could cause the spoon to slip right into the hand of the user holding and stabilizing the bagel, whereas holding the bagel itself in front of the bagel scooper and pulling rearward away from the holding hand of the user would not cause any slipping or possible cutting of the user's hand or ripping of the delicate bagel wall.

Additionally, the hand-held manipulation of the bagel scooper allows the user to remove unwanted dough from a bagel without physical stress or strain to user's hand or wrist, avoiding carpal tunnel problems.

The use of the downwardly extending scoop recess in the present invention for bagel scooper, with downward and rearward pulling, would be discouraged, if not clearly taught away from the spoon of Green '951.

Among related patents include U.S. Pat. No. 5,920,991 of Tracy, which discloses a device for cutting and loosening dough from a piece of baked goods, such as a bagel, which includes a handle, and an open blade structure, to enable scooping and removal of dough. The blade structure of Tracy '991 is attached to a cross bar, which is attached to a stem, which, in turn, is attached to the handle. There are five different parts to this structure (a blade, crossbar, stem, handle and set screw).

However, as noted in the drawing Figures of Tracy '991, Tracy is not capable of scooping and removing cut dough, since the dough cut by an open blade structure having a peripheral cutting edge adjacent to an open recess between the blade cutting edge and stem attaching the blade to the handle. For example, as shown in FIGS. 1 and 2 of Tracy '991, the cut dough excised by curved blade 14 falls through the open semi-circular recess hole provided between the cutting edge 22 of semi-circular blade 14 and the horizontal cross bar 32. Tracy '991 requires the additional step of manually removing the pieces of cut dough from the bagel, which defeats the purpose of providing a tool for cutting excess dough from the interior of a sliced bread product, such as a bagel.

Other food scraping articles having an open blade with a cutting edge defining a recess through which food passes include U.S. Pat. No. 4,345,516 of Sinclair for cooking an egg, U.S. Pat. No. 2,447,301 of Wright for a corn niblet scraper and U.S. Pat. No. 1,991,267 of Waldron for a bean pod cutter.

Among other related patents include U.S. Pat. No. 4,979,419 of Sonkin, which discloses a bagel cutter with a manually rotatable blade housing, having a pair of blades which scrape and cut excess bagel dough from the core of a sliced bagel. Like Tracy '991, Sonkin '419 cuts the core of the bagel but doesn't provide the ability to scoop out the core dough of the bagel, which still leaves that task to be done by the fingers of the user, which can be unsanitary.

Both Tracy '991 and Sonkin '419 require the use of another second device, to remove the unused dough scraped within the core of the bagel. Therefore, the present invention provides the utility of both the scooping and removing actions required.

Therefore, neither Tracy '991 nor Sonkin '419 describe a hand held bagel scooper for both scooping and removing excess dough from the inside of a bread product, such as a cut bagel.

Other rotating food scraping machines are described in U.S. Pat. No. 5,557,998 of Schwartz, for a rotating bagel coring device and U.S. Pat. No. 5,033,193 of Valenti, for a rotating bagel scooper. Additional related prior art patents also include U.S. Pat. No. 644,732 of Crandall, which describes a corn cutting spoon, including a bottom mid portion of the concave spoon head being interrupted by a serrated cutting edge, which allows the user to scrape corn niblets loose from a corn cob, by a rearward pulling motion. However, the cutting edge of Crandall '732 is located away from the leading edge, since the exterior of a corn cob is tubular, with no concave recess within which to manipulate the tool.

Other spoon-shaped articles having a medial cutting edge at a recess thereof include U.S. Pat. No. 3,937,850 of Farba.

However, the aforementioned reference actually do not teach the use of a bagel scooper which both scrapes and removes bagel dough from the inner core of a sliced bagel.

The bagel scooper of the present invention overcomes the problems associated with the prior art references, such as the inability to remove the scraped dough material from a hollowed out bagel. Therefore, the prior art patents are unsatisfactory, because they do not have the means for both scraping and removing the excess bagel dough. The configurations of the cutting edges of the prior art, as well as the rotatable devices, hinder the effectiveness of scraping and removing excess bagel dough with further manual manipulation of the scraped bagel dough.

Thus, the aforementioned references teach devices which in general are not suitable for both scraping and removing excess bagel dough from the interior core of a sliced bagel or other food product.

The use of the concave scoop with a downward curvature and a combined blade and scoop at the leading edge of the concave member, as disclosed in the bagel scooper of the present invention, would be discouraged, if not clearly taught away from the prior art.

OBJECTS OF THE INVENTION

It is therefore an object of the present invention to provide a hand held bagel scooper for both scooping and removing excess dough from the inside of a bread product, such as a cut bagel.

It is also an object of the present invention to provide bagel scooper which is sanitary and which eliminates scooping of excess dough from a bagel by the fingers of a user.

It is also an object of the present invention to provide a dough remover which is ergonomic and easy to use.

Other objects which become apparent from the following description of the present invention.

SUMMARY OF THE INVENTION

In keeping with these objects and others which may become apparent, the present invention is device for removing dough from a piece of baked goods which includes a handle, and a concave, preferably shallow elliptical spoon-shaped combined blade and scoop structure, having a downward curvature, to enable rearward scooping and removal of dough. The outer distal end of the combined blade and scoop structure is preferably serrated, to allow for scraping and scooping of the bagel core dough at a leading edge of the combined blade and scoop. The combined blade and scoop structure is attached to a stem, which, in turn, is attached to the handle.

The present invention is a device, which has three functions. Its structure is very simple, but practical. It is one long piece of stainless steel with a deep round hollow head used to make one big scoop to get all the dough out. At the other end is an optional small rectangular edge, embodied with teeth to further scoop the bagel providing a clean hollow bagel.

The two edges are connected by a handle preferably with a soft piece of rubber allowing for a safe grip, as well as a comfortable grip.

The present invention is a bagel scooper which unlike other food scrapers, actually scoops out the excess dough, leaving hardly, if any, excess dough residue. Alternatively, the bagel scooper of the present invention can be used to scrape other food products, such as bread rolls, vegetables or fruit.

Other inventions similar to the bagel scooper simply cut and flatten the dough, taking only the top layers of dough off. In contrast to the prior art, the bagel scooper of the present invention includes a deep concave head, which enhances the performance by enabling a person to scoop out and lift away the entire core of the bagel, thereby providing a much healthier meal.

For example, in contrast to the bagel scoop of the present invention, the bagel scraper of Tracy '991 is a general purpose device for use on baked goods in general. The single piece construction of the present invention simplifies the manufacturing process of fabricating the bagel scooper and it also enhances the reliability over Tracy '991 which has five different parts that are subject to breakage. Also, Tracy '991 has a weak structure point in the stem, connecting the blade to the handle, which is subject to break from the force of pressing down on the handle. In contrast to Tracy '991, the bagel scooper of the present invention is an improved design forged out of one piece of metal and therefore, not subject to possible failures of the multiple elements of the structure of the Tracy '991 design.

Unlike the corn cutting spoon of Crandall '732, which does not have a cutting edge at a leading edge, in the bagel scooper of the present invention the cutting surface is at a distal leading edge, to allow hand-held manipulation of the bagel scooper within the hollow, indented core of half toroidal shape of a cut bagel.

The bagel scoop of the present invention also is much more sanitary when used in a business such as a bagel store. The use of this handy tool provides the bagel store worker with a convenient way of pleasing the customer, as well as a safe way to scoop out the bagels, which are usually hot.

Another feature of the bagel scooper is its rear edge located at the opposite end of the actual scoop. This rear edge has preferably a small serrated edge, which can fine tune the extraction of excess dough from the inner core of the sliced bagel, picking up any left over dough from the original scoop. This just further ensures the cleanliness of the scoop, thus providing the customer or homeowner with a perfectly hollow bagel.

There are advantages to this style of preparing a bagel. First of all, carbohydrates are a big factor in keeping fit nowadays. By scooping the inner dough out, the bagel becomes significantly healthier. Also, by having a hollow core, the bagel scooper allows for food to be placed in the remaining pockets, almost similar to a pita shell. For example, one could place an egg white in the core and have a healthy egg breakfast, or try some hummus for a great snack.

Another feature of the bagel scooper is its elastomeric grip, made of a smooth cushion type material, such as rubber or foam. The elastomeric grip not only provides the user with a safe grip but it also allows for a comfortable grip.

The first and most important function of the present invention is to actually scoop the dough out of a bagel that has been cut in half. By doing so makes the bagel much healthier because the dough contains calories and carbohydrates which, in turn, will be removed.

The second function of the bagel scooper is its attraction to bagel stores and homeowners. By using this tool one can safely remove the dough without using their fingers. By using one's fingers, a user could get burnt, because bagels are sometimes hot and also it is unsanitary, especially in a business. Although most workers wear gloves, most workers also hand back money with those very gloves on. Then the workers use those gloves to pick out the dough, thus contaminating the bagel with germs or other pathogens transferred from the currency to the gloves of the fingers of the worker.

By using this hand held scoop of the present invention, the worker is happy because the worker is not getting burnt and more importantly, the customer is happy, which is always the main objective.

An advantage to this tool is also its attraction to homeowners. It is small and easily stored. Most homeowners buy bagels by the dozen. By having this bagel scooper at home, one could scoop out their own bagels making it a healthier snack, as well as providing a hollow pocket which is also a third function of the bagel scoop of the present invention.

The bagel scooper not only picks out dough but by doing so creates hollow pockets allowing one to put food inside, much like a pita shell. This creates a convenient way to make a bagel sandwich.

The present invention greatly simplifies the structure of a bagel scooper since it is a one piece construction made out of a stiff, shaped stainless steel or other suitable material, which has a serrated spoon shaped cutting edge which is designed specifically for digging in and removing dough from bagels.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
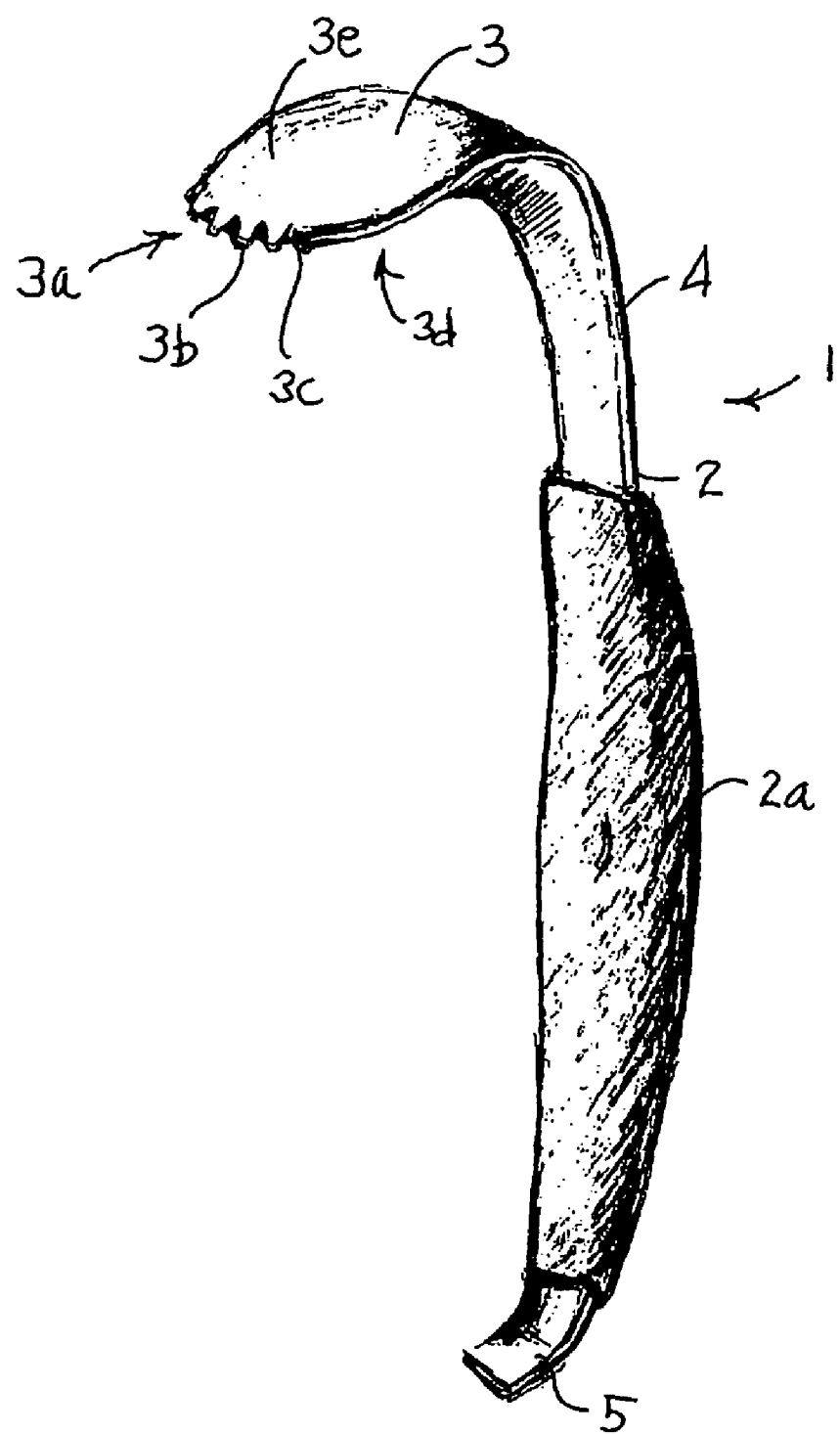
FIG. 1 is a perspective view of the bagel scoop of the present invention.

The present invention has broad applications to many technical fields for a variety of food articles to have excess material scraped and removed without the need for further manual manipulation.

As shown in FIGS. 1-5, the bagel scoop 1 removes excess dough from a piece of baked goods, such as a sliced bagel. The bagel scoop 1 includes handle 2, and a closed concave combined blade and scoop structure 3, preferably being shallow and elliptical spoon-shaped, when viewed from above and in cross section, having a downward curvature extending forward and then downward off of the longitudinal axis of handle 2, to enable scooping and removal of excess dough 102 from inner bagel core 101 of bagel 100.

Outer distal end 3a of combined blade and scoop structure 3 is preferably serrated with teeth 3b, thus forming cutting edge 3c, to allow for scraping and scooping of bagel core dough 102 at leading edge 3c of combined blade and scoop structure 3. Blade structure 3 is attached to stem 4, which, in turn, is attached to handle 2.

Figure 2:
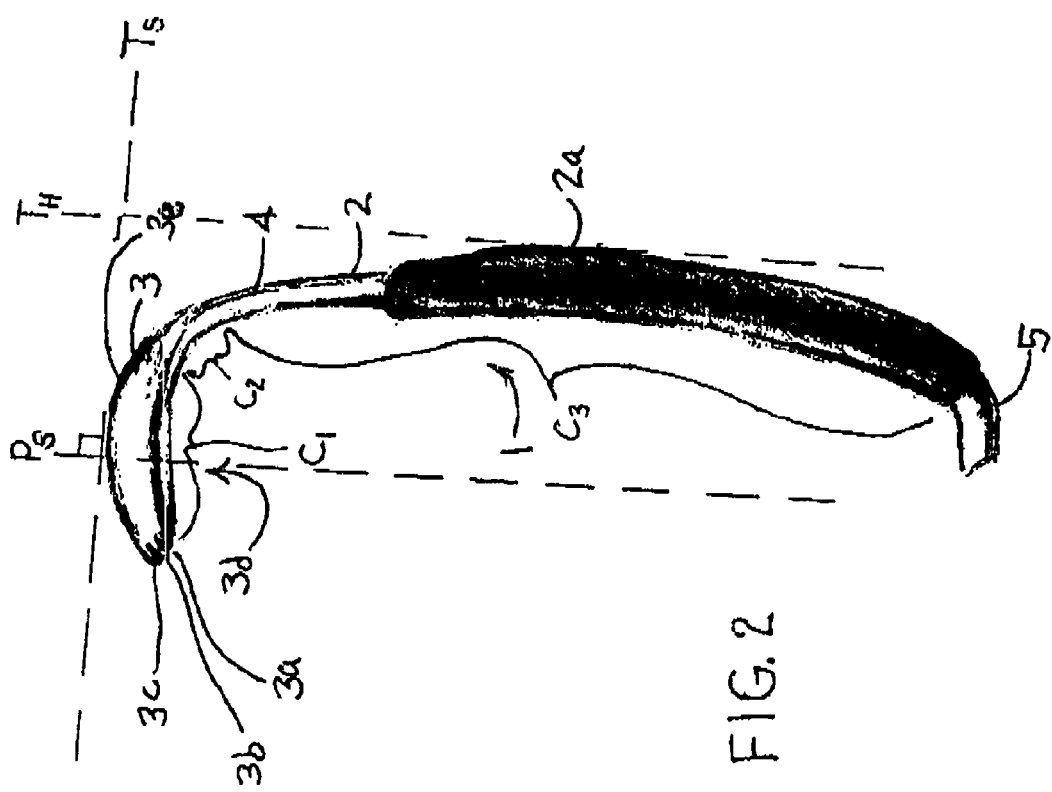
FIG. 2 is the side view thereof.
Figure 3:
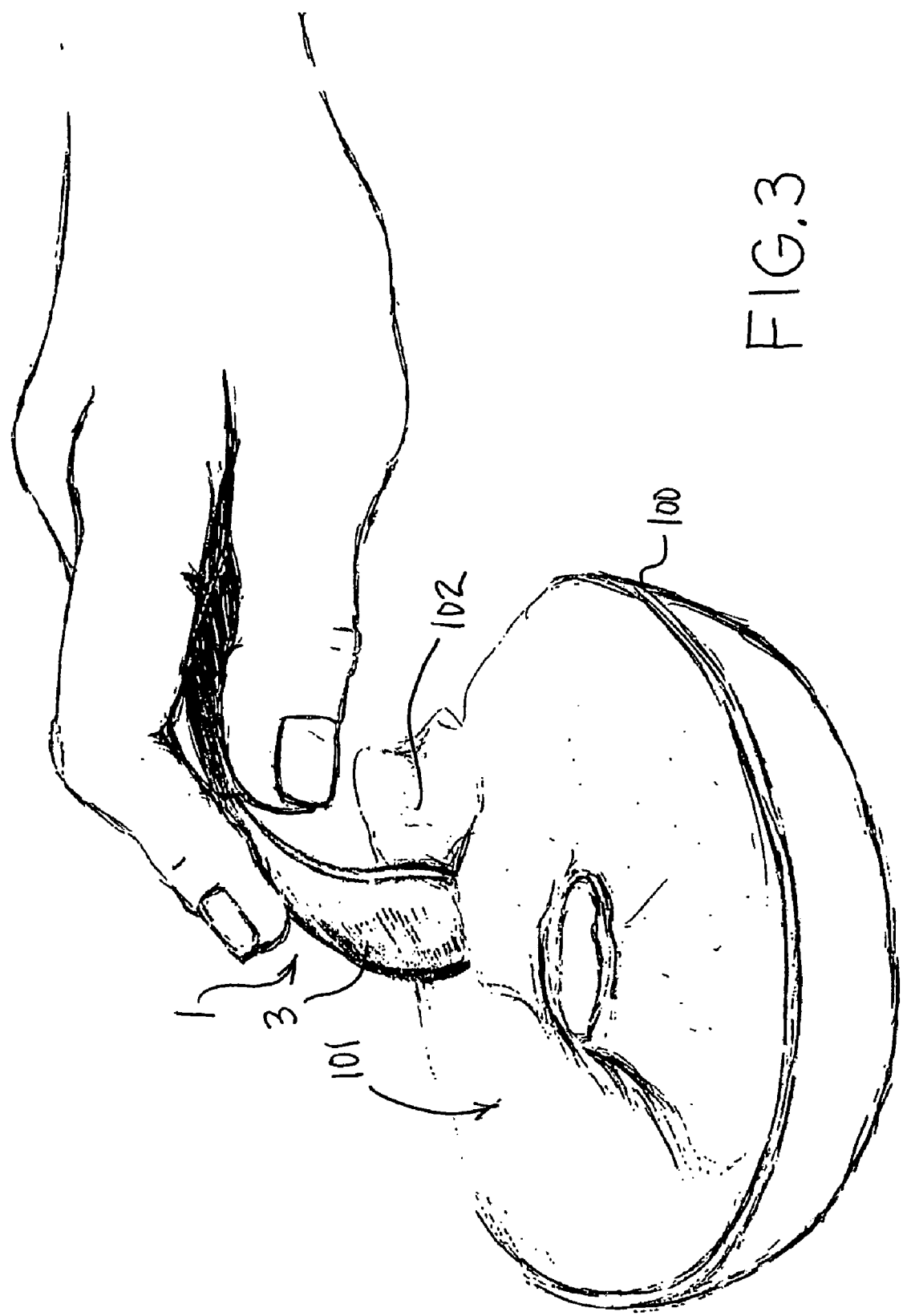
FIG. 3 is the environmental view, showing how the bagel scoop of the present invention is capable of thoroughly scooping out the undesired part of the bagel.
Figure 4:
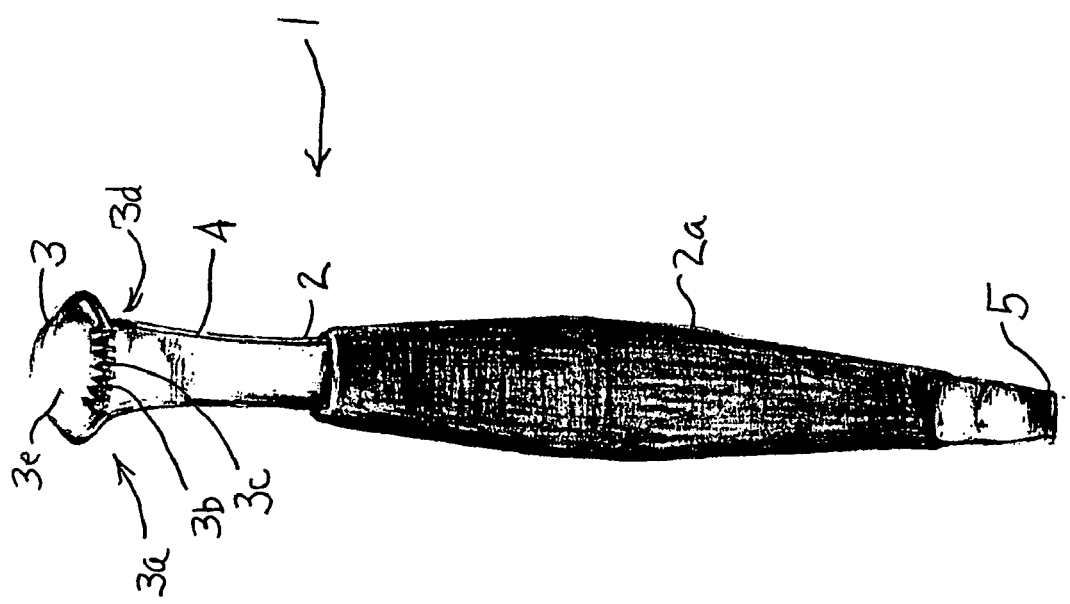
FIG. 4 is the front view of the present invention, showing the teeth of the leading edge of the scooper, as well as the rear edge used for finer scooping; and, FIG. 5 is another environmental view of the present invention displaying how the scooper fits comfortably in one's hand while being used.
Figure 5:
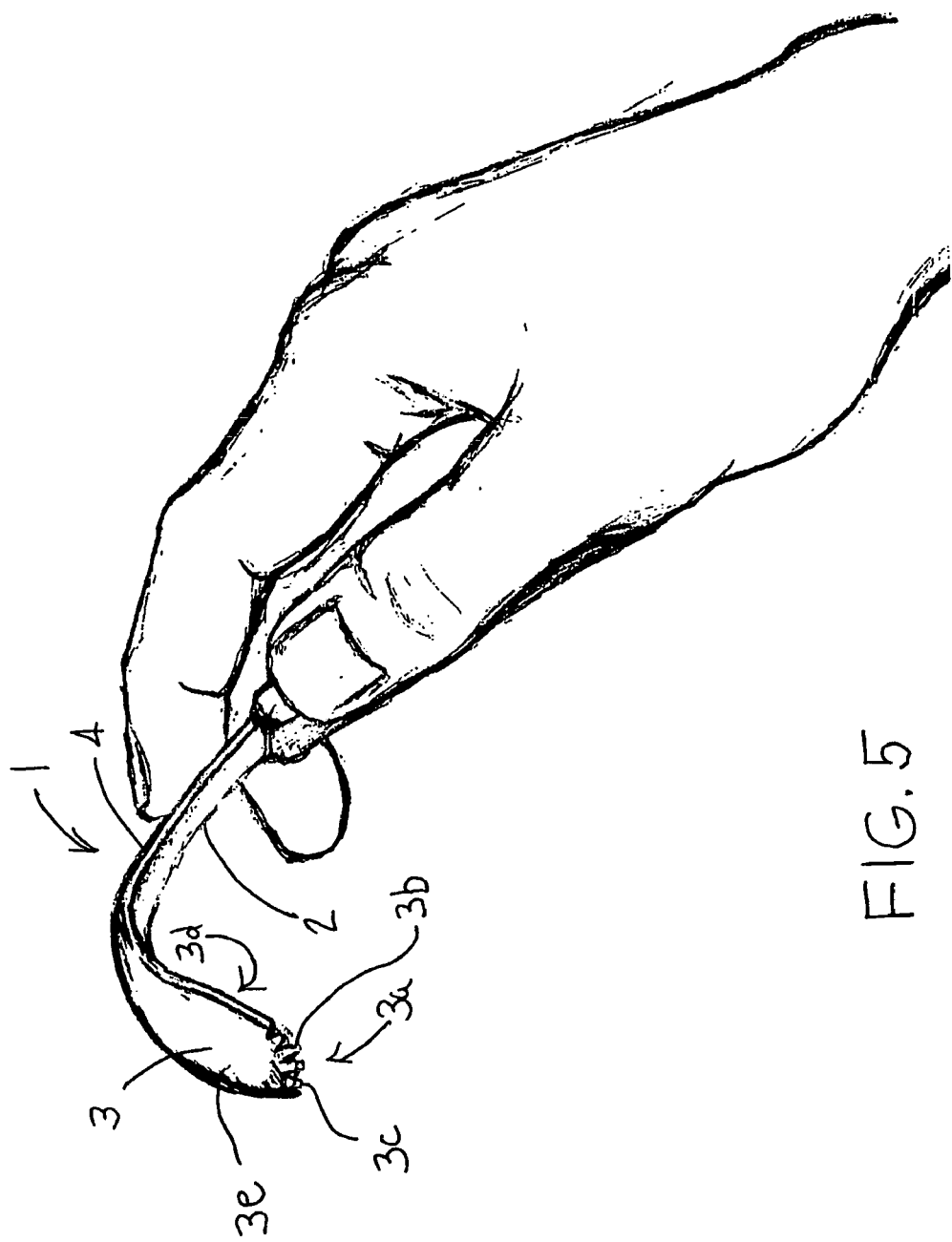

FIG. 2 is a side view of bagel scooper 1. Starting from optional small scoop scraper 5 at the bottom of FIG. 2, continuing up handle 2 and further to stem portion 4 and terminating at the distal end 3A of scoop structure 3, no inflection points are encountered, as the shaped of the curvature is constantly concave (to the left in FIG. 2), albeit of varying arc radii. Note that a tangent $T_h$ to the side center of handle $2_a$ is at a right angle to the tangent $T_s$ to the top of the bowl shaped wall 3e of the scoop structure 3; this geometric relationship is key to the ergonomic design of bagel scoop 1. The right angle orientation of the tangent $T_s$ of scoop 3 to the tangent $T_h$ of handle 2, plus the continuous concavity of handle 4, without any inflection points, provides the proper tangential force necessary to scoop and remove dough from a bagel.

Handle 2 of bagel scoop 1 is preferably is one long piece of stainless steel. Preferably, handle 2 is concave, as opposed to being straight and/or cylindrical, to enable the user to hold within the palm of the hand without unnecessary axial rotation during rearward scooping of excess dough within the limited confines of a knife-cut toroidal half portion of a bagel.

Combined blade and scoop structure 3 is preferably concave, having a closed recess 3d formed by closed bowl shaped wall 3e, forming a round hollow head container used to both scrape and remove excess dough 102 from inner core 101 of bagel 100.

At the other end of bagel scoop 1 is an optional small scraper 5, preferably being of a rectangular edge, embodied with teeth to further scoop the bagel 100, with a clean hollow bagel core 101. Small scraper 5 also has a downward curvature off of the longitudinal axis of handle 2, to both scrape and remove fine pieces of dough residue not removed by combined blade and scoop structure 3 at the other leading end of bagel scoop 1.

Small scraper 5 also functions as an ergonomic rest for the lateral edge of the palm of the fist of the user holding handle 2 of bagel scoop 1.

Combined blade and scoop structure 3 and small scraper 5 are connected by handle 2, preferably with a soft cushion sleeve 2a, such as a hollow piece of rubber, allowing for a safe grip, as well as a comfortable grip.

In a preferred embodiment, as shown in FIG. 2, scoop 3 of bagel scoop 1 has a first predetermined concavity $C_1$ of a first arc radius. Stem 4, which attaches scoop 3 to handle 2, has a second predetermined concavity $C_2$ of a second arc radius which extends from concavity C, of scoop 3, without an inflection point changing direction of concavity therebetween. Moreover, handle 2 has a third predetermined concavity $C_3$ of a third arc radius, which extends from concavity $C_2$ of stem 4, without an inflection point changing direction of concavity therebetween. Therefore, the inner side of bagel scoop 1, from which closed concavity of scoop 3 faces downward, has a continuous concavity of varying arc radii. The continuous concavity makes bagel scoop 1 comfortable to use, and the lack of inflection points prevents the application of force at an inflection point, and prevents undesirable bending or breaking at any inflection point.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A manually held bagel scoop for removing excess dough from a toroidal bagel food product comprising:
   a longitudinally extending handle having a stem portion extending therefrom,
   said stem portion having a shallow elliptical spoon-shaped concave bowl substantially perpendicular thereto,
   said shallow elliptical concave spoon-shaped bowl having a mid-section and a distal end opposing said stem portion,
   said mid section wider than said distal end of said elliptical spoon-shaped concave bowl,
   said elliptical spoon-shaped concave bowl having an upwardly extending wall forming a continuously curved peripheral edge blade atop said upwardly extending wall,
   said peripheral edge blade facing downwardly and forming a combined blade and scoop structure;
   said longitudinally extending handle having a partially covered soft cushion gripping sleeve extending around said longitudinally extending handle located partially within said soft cushion gripping sleeve;
   an auxiliary scraper being provided at an opposite end from said elliptical spoon-shaped concave bowl of said manually held bagel scoop;
   said combined blade and scoop structure and said handle each having a downward curvature extending from a longitudinally extending axis of said handle,
   said combined blade and scoop structure used to rearwardly scrape and remove excess dough residue rearward from an inner core of a bagel,
   said combined blade and scoop structure having a first curvature of concavity of a first arc radius,
   said stem portion having a second curvature of concavity of a second arc radius and said handle, located partially within said soft cushion gripping sleeve, having a third curvature of concavity of a third arc radius,
   said auxiliary scraper having a further curvature of concavity of a further arc radius;
   said auxiliary scraper extending substantially perpendicular off of said handle at said opposite end of said manually held bagel scoop from said elliptical spoon-shaped concave bowl;
   wherein, excluding said soft cushion gripping sleeve surrounding said handle, starting from said scraper, continuing to said handle and further continuing to said stem portion and terminating at the distal end of said blade and scoop structure, no inflection points are encountered as a combined curvature shape of said first, second and third curvatures is constantly concave,
   wherein further, a tangent to an outer side center of said handle is generally colinear with said handle, wherein further said tangent is perpendicular to a top of said bowl-shaped wall of said blade and scoop structure; and said tangent is substantially perpendicular to a bottom of said scraper.

2. The manually held bagel scoop as in claim 1 wherein an outer distal end of said concave combined blade and scoop structure is serrated with teeth scraping and scooping of the food product residue, said teeth being located a leading edge of said concave closed combined blade and scoop structure.

3. The manually held bagel scoop as in claim 1 wherein said auxiliary scraper provides a resting area for the lateral portion of the user's palm when operating said manually held bagel scoop.

* * * * *